(12) United States Patent
Gaumer

(10) Patent No.: US 8,079,607 B2
(45) Date of Patent: Dec. 20, 2011

(54) SPHERICAL BEARING FOR A STEERING JOINT

(75) Inventor: Brian Gaumer, Watertown, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 267 days.

(21) Appl. No.: 12/420,331

(22) Filed: Apr. 8, 2009

(65) Prior Publication Data

US 2009/0252443 A1 Oct. 8, 2009

Related U.S. Application Data

(60) Provisional application No. 61/043,237, filed on Apr. 8, 2008.

(51) Int. Cl.
*B60G 7/00* (2006.01)

(52) U.S. Cl. .......... 280/93.502; 280/86.754; 280/86.756

(58) Field of Classification Search ............. 280/93.502, 280/124.134, 86.754–86.756
See application file for complete search history.

(56) References Cited

U.S. PATENT DOCUMENTS

| | | | | |
|---|---|---|---|---|
| 4,386,869 A * | 6/1983 | Smith | ............................. | 403/39 |
| 4,483,569 A * | 11/1984 | Smith | ............................. | 384/2 |
| 4,493,512 A * | 1/1985 | Smith, Jr. | ............................. | 384/2 |
| 4,616,387 A * | 10/1986 | Smith, Jr. | ............................. | 29/898.05 |
| 4,904,106 A * | 2/1990 | Love | ............................. | 403/39 |
| 5,772,352 A * | 6/1998 | Fukumoto et al. | ............................. | 403/144 |
| 6,019,541 A * | 2/2000 | Maughan | ............................. | 403/140 |
| 6,042,293 A * | 3/2000 | Maughan | ............................. | 403/135 |
| 6,505,990 B1 * | 1/2003 | Maughan | ............................. | 403/135 |
| 2002/0197103 A1 * | 12/2002 | Maughan | ............................. | 403/135 |
| 2009/0226244 A1 * | 9/2009 | Byrnes et al. | ............................. | 403/135 |

* cited by examiner

*Primary Examiner* — Faye M. Fleming
(74) *Attorney, Agent, or Firm* — Michaud-Kinney Group LLP

(57) ABSTRACT

A spherical bearing including a ball having an external surface defined by an outside diameter of said ball and an outer race having an inside surface contoured to a shape defined by said external surface of the ball. The inside surface extends between a stud end and a cover end of the outer race. The ball is moveably positioned within the outer race such that the inside surface and the external surface slidably engage one another. The inside surface includes at least one lubrication groove formed therein. The lubrication groove initiates at a first position adjacent to the cover end and terminates at a second position adjacent to the cover end. Remaining portions of the lubrication groove are spaced apart from the stud end.

13 Claims, 7 Drawing Sheets

SPHERICAL BEARING FOR A STEERING JOINT

CROSS-REFERENCE TO RELATED APPLICATION

This application claims the benefit of U.S. provisional patent application Ser. No. 61/043,237 filed Apr. 8, 2008, which is incorporated herein by reference.

FIELD OF THE INVENTION

The present invention is generally directed to a spherical bearing for use in a steering joint for heavy haul trucks and is more specifically directed to a spherical bearing having intersecting lubrication grooves open to a tapered face of the spherical bearing.

BACKGROUND OF THE INVENTION

Spherical plain bearings typically have a steel alloy or ceramic ball positioned in a steel alloy outer race. The outer race defines an inner surface contoured to receive the spherical ball therein. The ball slides and rotates relative to the outer race. Therefore, a lubricant is typically provided between the spherical ball and outer race to allow the bearing to be operable for extended periods of time.

The ball typically includes a shaft extending therefrom and the outer race includes an exterior mounting surface for engaging a complementary mating surface. Such spherical plain bearings can be used in rod ends which offer ease in mounting and adjustment of position in installations such as mechanisms, linkages, and control rods. Rod ends also provide a compact, lightweight, economical design alternative to a conventional housing installation. Rod ends can be used in aircraft, helicopters, jet engines, military vehicles, submarines, surface ships, transportation equipment, agricultural and recreational vehicles, lawn and garden equipment, material handling, and fluid power applications.

SUMMARY OF THE INVENTION

According to one aspect of the present invention, a spherical bearing including a ball having an external surface defined by an outside diameter of the ball and an outer race having an inside surface contoured to a shape defined by the external surface of the ball, is disclosed. The ball is moveably positioned within the outer race such that the inside surface and the external surface slidably engage one another. Opposing ends of the outer race define a stud end and cover end which the inside surface extends between. A stud can extend from the ball and project through the stud end of the outer race. A cover can be positioned on the cover end of the outer race.

The inside surface includes at least one lubrication groove formed therein. The lubrication groove initiates at a first position and terminates at a second position on the cover end of the outer race. Remaining portions of the lubrication groove are spaced apart from the stud end of the outer race.

In one aspect of the present invention, one or more tapered surfaces extend outwardly from the inside surface and terminate at the stud end or the cover end of the outer race. One or more of the lubrication grooves intersect the tapered surface located adjacent to the cover end of the outer race, at the first and/or second positions.

In yet another aspect of the present invention, the there is a mounting groove formed in and extending around a portion of the inside surface adjacent to the stud end. A compliant seal having a base portion and at least one lip portion extending from the base portion, is secured to the mounting groove such that the base portion engages the mounting groove. At least one of the lip portions protrudes from the mounting groove and slidingly engages the external surface of the ball.

DETAILED DESCRIPTION OF THE PREFERRED EMBODIMENT

Figure 1:
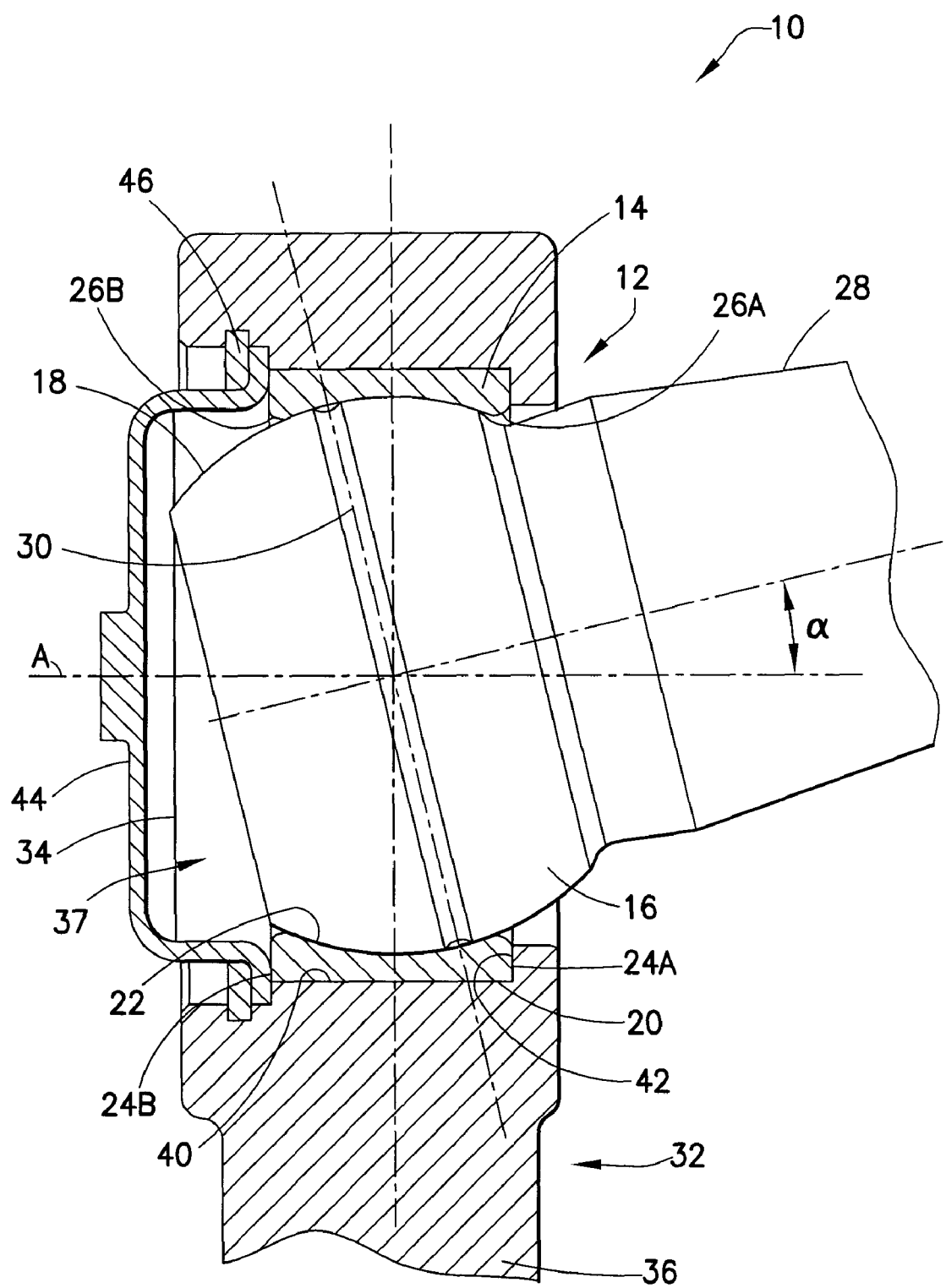
FIG. 1 is a schematic illustration of a portion of a rod end assembly.

FIG. 1 illustrates a rod end assembly 10 including a spherical bearing 12 having an outer race 14 fit over a ball 16 moveably positioned therein. The ball 16 has an external surface 18 defined by an outside diameter of the ball. The outer race 14 has a cylindrical external surface 20 and an inside surface 22 contoured to a shape defined by the external surface 18 of the ball 16. Opposing ends of the outer race 14 define a stud end 24A and cover end 24B which the external surface 20 and the inside surface 22 extend between. Tapered portions 26A, 26B extend around and outwardly from the inside surface 22 and terminate at the stud and cover ends 24A, 24B, respectively. A stud 28 projects from the ball 16 and extends through the stud end 24A of the outer race 14. Forces applied to the stud 28 and/or outer race 14 cause the ball 16 to move relative to the outer race 14. The ball 16 and the stud 28 are shown offset at an angle $\alpha$ measuring about eleven degrees from a central axis A of the spherical bearing 12. The tapered portion 26A on the stud end 24A allows the ball 16 and the stud 28 to move to the offset position without the outer race 14 limiting such movement. The tapered portion 26B helps lubricant to flow into the spherical bearing 12 as discussed below.

While the ball 16 and stud 20 are shown in an offset position at an angle $\alpha$ measuring about eleven degrees from a central axis A, the present inventions is not limited in this regard, as the ball and stud can be positioned in other configurations, including but not limited to offsets greater or less than eleven degrees, without departing from the broader aspects of the present invention.

A lubricant (not shown) is disposed on the external surface 18 and the inside surface 22 to reduce friction therebetween. The ball 16 has a centrally located groove 30 extending inwardly from the external surface 18 and extending circumferentially around the ball. The lubricant is stored in the groove 30 for spreading the lubricant over the inside surface 22 and/or external surface 18, when the ball 16 moves relative to the outer race 14. Lubricants such as petroleum based and/or synthetic greases can be employed.

Although the lubrication groove 30 is shown centrally positioned on the ball 16, the present invention is not limited in this regard as any number of lubrication grooves positioned in any configuration on the ball may also be used without departing from the broader aspects of the present invention.

Figure 2:
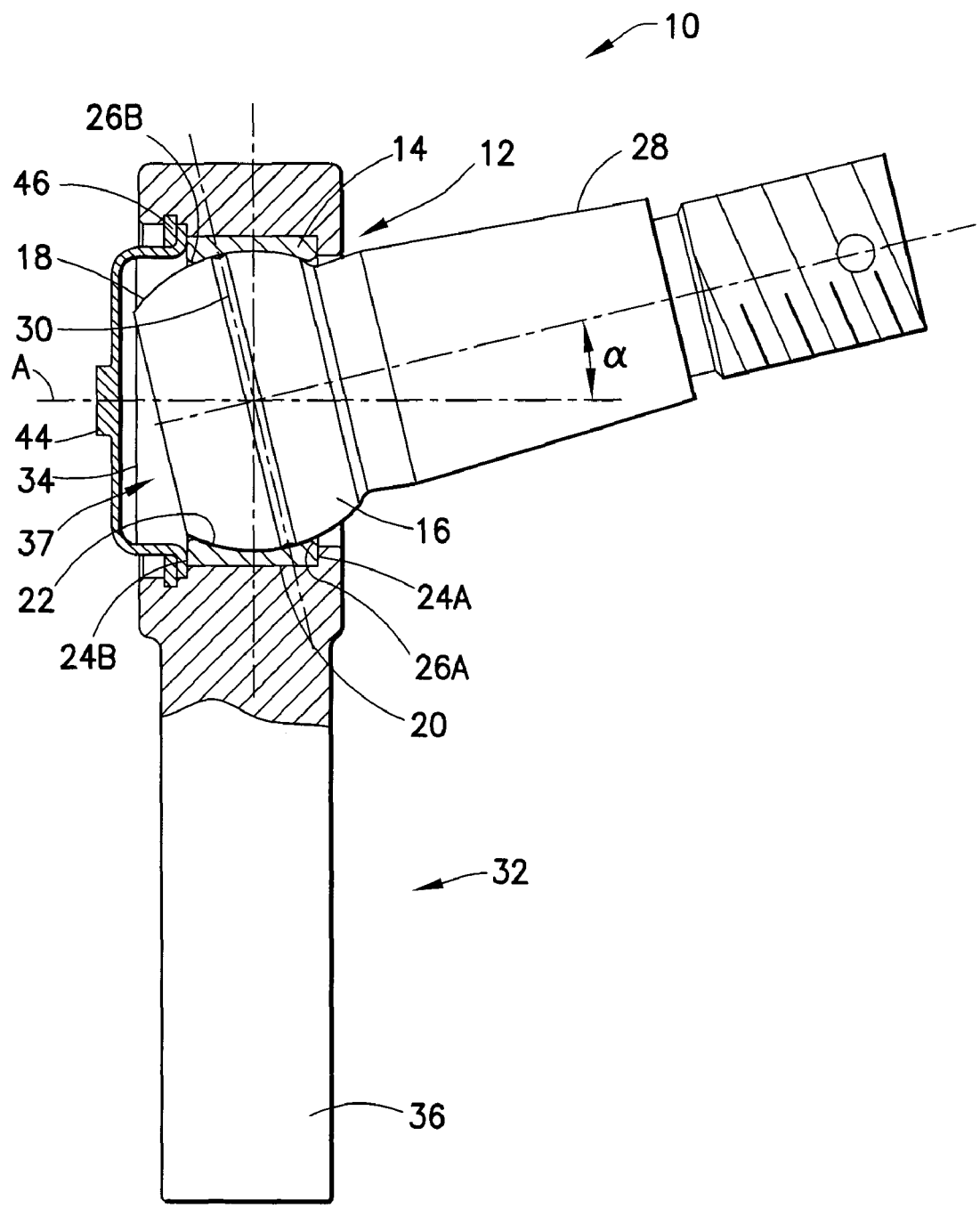
FIG. 2 is a schematic illustration of the rod end assembly.

As illustrated in FIGS. 1 and 2, the rod end assembly 10 includes a rod end 32 having a bearing receiving portion 34 and shaft portion 36 extending from the bearing receiving portion. The bearing receiving portion 34 has a bore 37 extending therethrough and defined by a cylindrical inside surface 40 terminating at an inwardly projecting shoulder 42. The spherical bearing 12 is positioned in the bore 37 such that the external surface 20 of the outer race 14 engages the inside surface 40 and the stud end 24A of the outer race abuts the shoulder 42. A cover 44 is positioned in a portion of the bore 37 adjacent to the cover end 24B of the outer race 14 and secured in place by a retaining ring 46. With the cover 44 removed, the lubricant can be placed into the bore 37 of the bearing receiving section 34. When installed, the cover 44 helps retain lubricant in the spherical bearing 10 and provides a barrier to foreign matter entry into the rod end 32.

Figure 3:
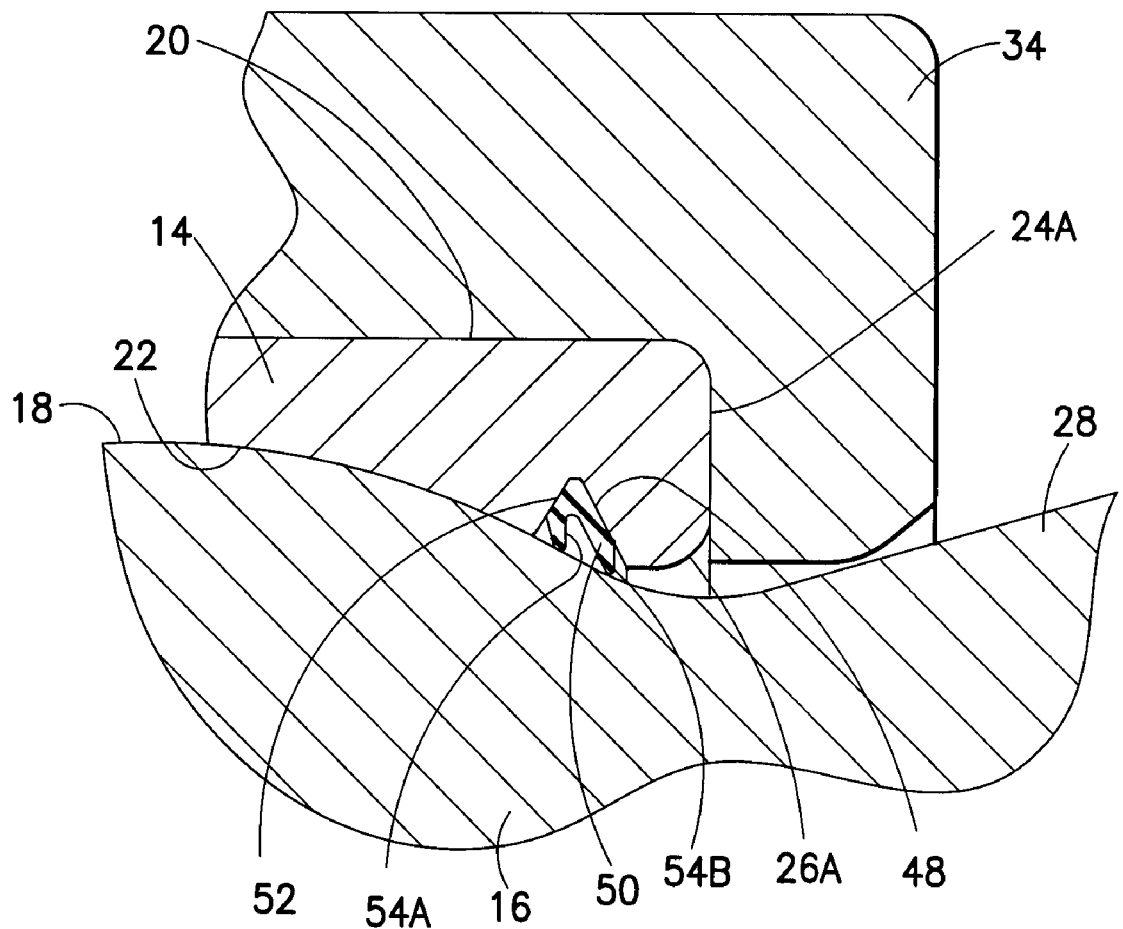
FIG. 3 is an enlarged view of a cross section of the rod end assembly with a compliant seal.

Referring to FIG. 3, a portion of the inside surface 22 adjacent to the stud end 24A of the outer race 14 has a mounting groove 48 formed in and extending around the inside surface 22 of the outer race 14. A generally round seal 50 having a V-shaped cross section defined by a base portion 52 and two lips 54A, 54B extending from the base portion, is positioned in the mounting groove 48. The base portion 52 is secured to a portion of the mounting groove 48 and one or both of the lips 54A, 54B protrude from the mounting groove and slidingly engage the external surface 18 of the ball 16.

The seal 50 is manufactured from a compliant material, for example, a material comprising nitrile or another synthetic rubber. One example of a seal 50 that can be used in the present spherical bearing 12, is a spread lock dual seal described in commonly owned U.S. Pat. No. 6,626,575, entitled Spherical Plain Bearing with Spread Lock Dual Sealing Means," the subject matter of which is incorporated by reference herein, in its entirety. Use of the seal 50 in the spherical bearings 12 can help maintain lubricant inside the spherical bearing and prevent contaminants from entering the spherical bearing. Thus the seal 50 increases the useful life of the spherical bearings 12, compared to standard configurations.

While the mounting groove 48 is described as being formed in and extending around the inside surface 22, the present invention is not limited in this regard as one or more mounting grooves located in other positions in the inside surface may be employed without departing from the broader aspects of the present invention. Although the seal 50 is described as having a V-shaped cross section defined by a base portion 52 and two lips 54A, 54B extending from the base portion, the present invention is not limited in this regard, as other configurations, including but not limited to a single lip seal, a seal having two or more lips of equal or unequal length, a seal having a circular or a rectilinear cross section, a seal comprised of more than one piece, a seal having perforations extending therethrough or a seal having a ribbed edge may be employed.

Figure 4:
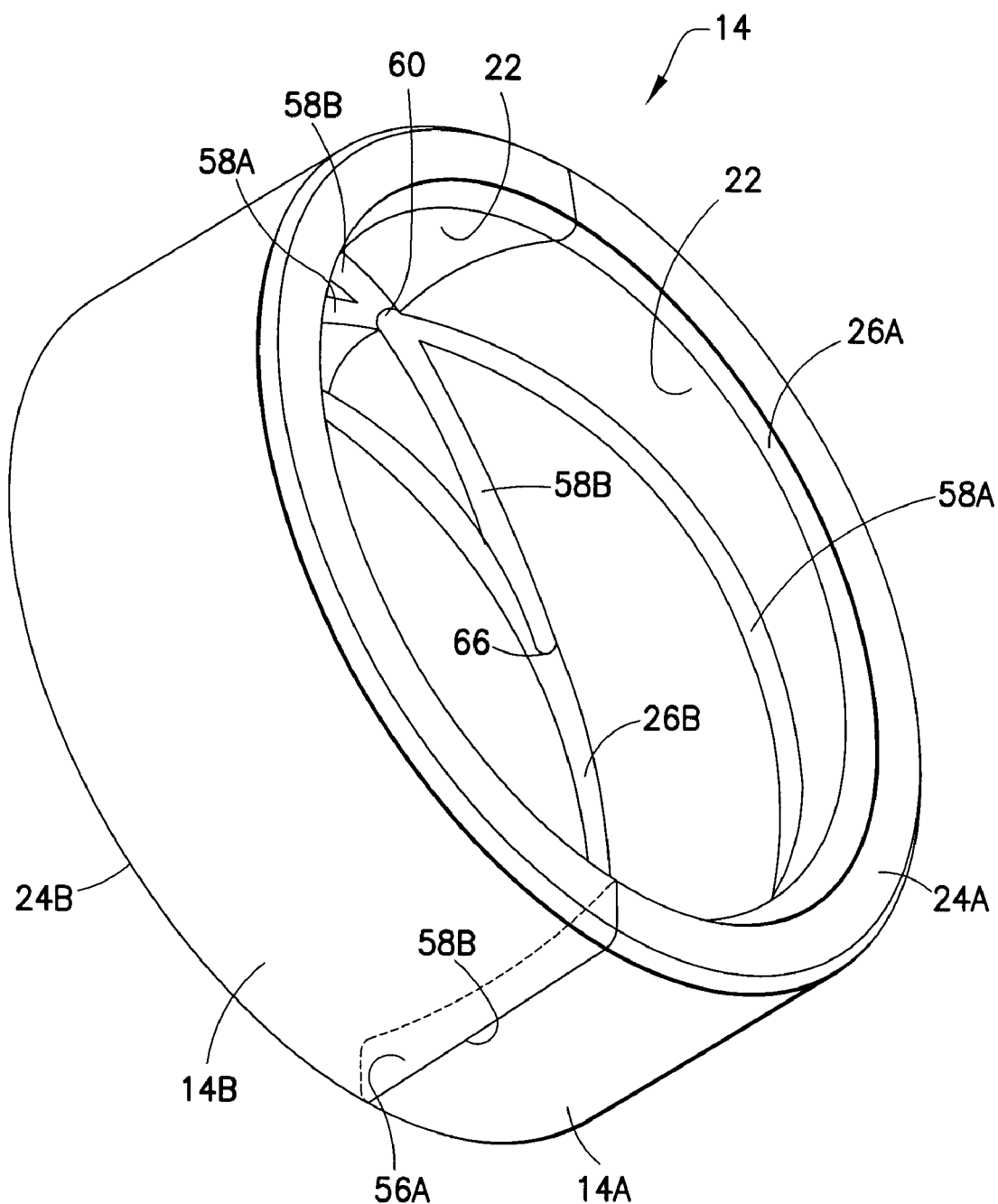
FIG. 4 is a perspective view of an outer race of a spherical bearing.

Referring to FIG. 4, the outer race 14 is shown with a first segment 14A abutting a second segment 14B, along respective mating surfaces 56A, 56B. Such a two piece configuration simplifies assembly of the spherical bearing 12, by allowing the ball 16 to be positioned in one of the first and second segments 14A, 14B before abutting the first and second segments together.

Figure 5:
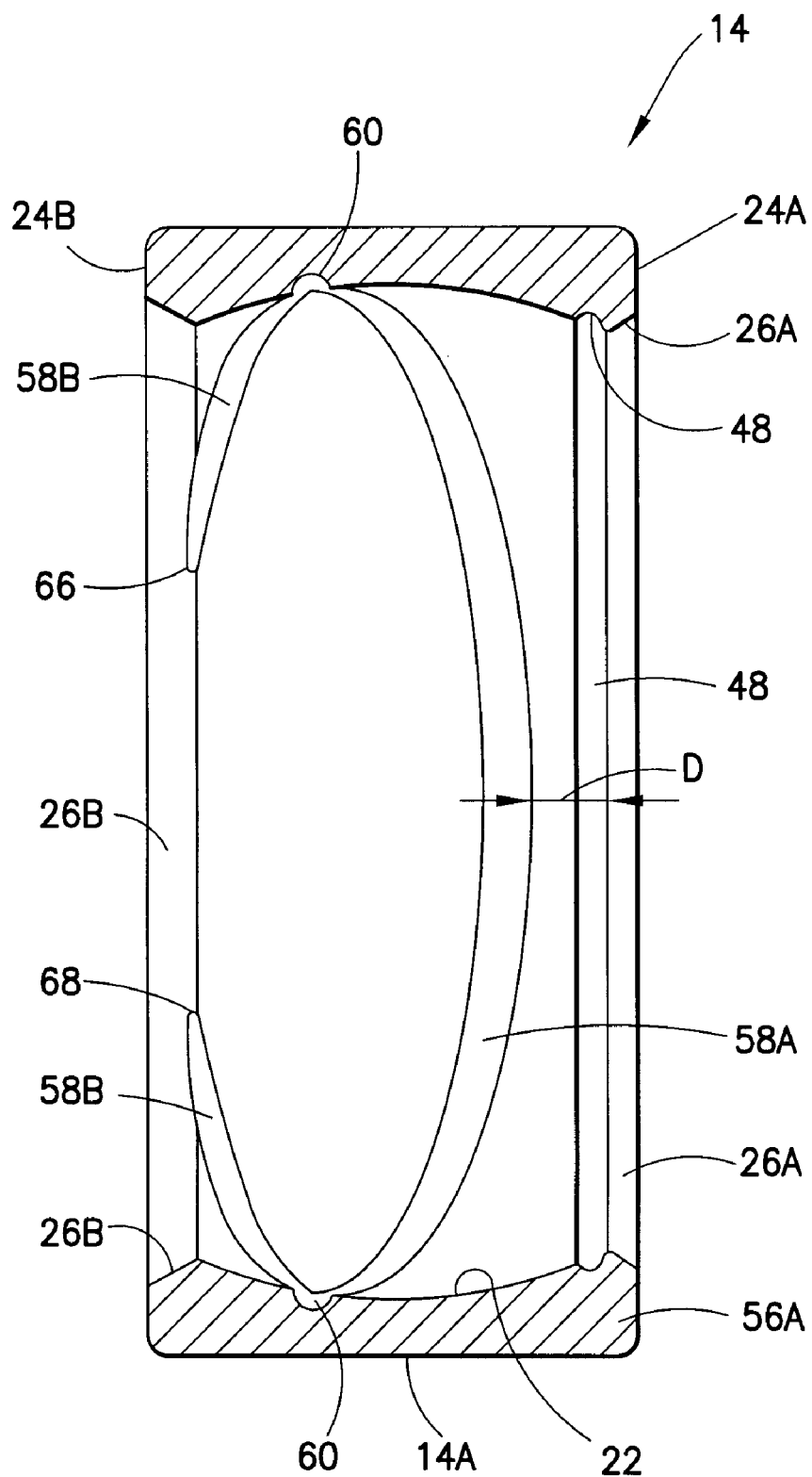
FIG. 5 is a cross sectional view of the outer race of FIG. 4.
Figure 6:
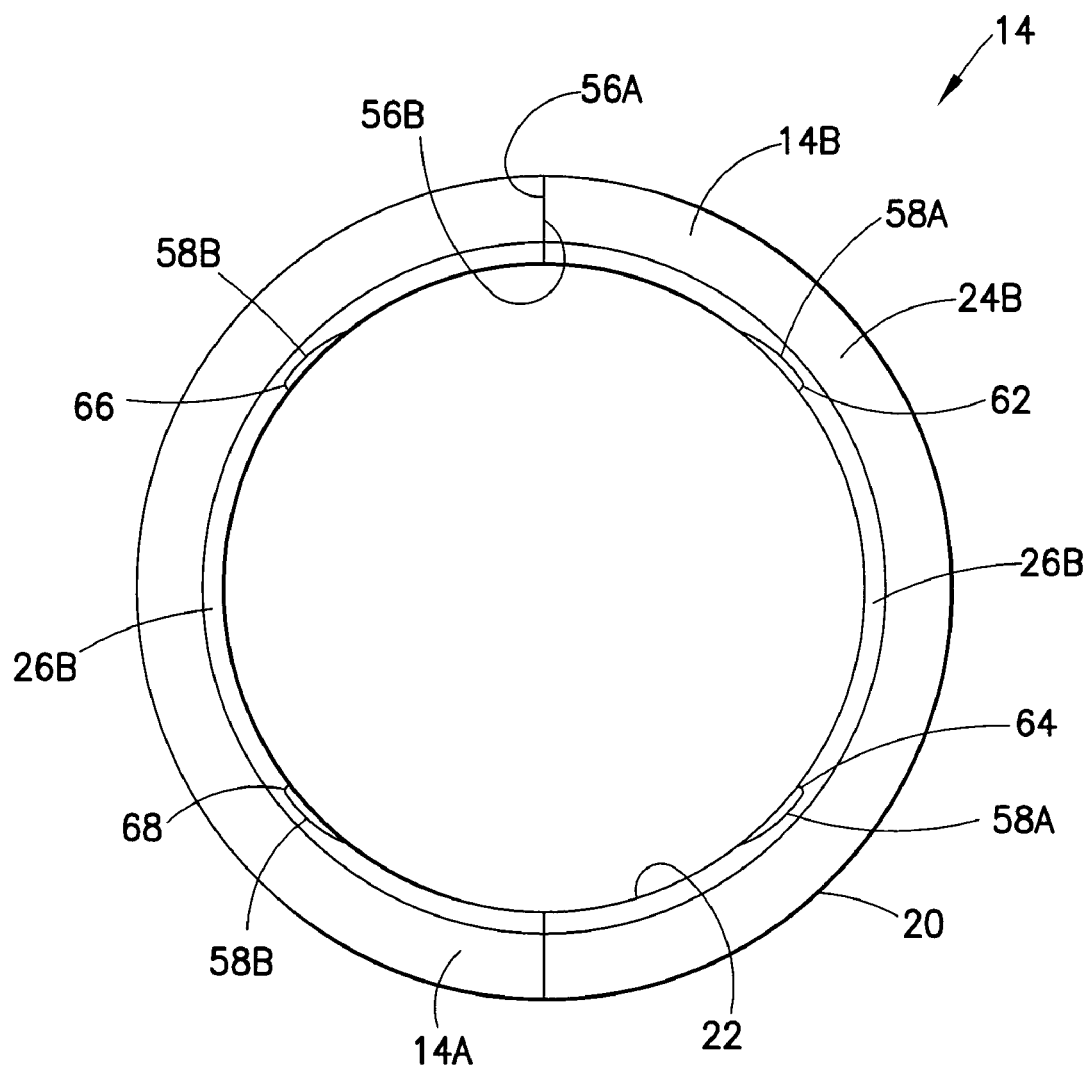
FIG. 6 is an end view of the outer race of FIG. 4.

As shown in FIGS. 4-6, the inside surface 22 of the outer race 14 is shown having a first lubrication groove 58A and a second lubrication groove 58B formed therein and intersecting one another at a juncture 60. The juncture 60 allows lubricant to cross-flow between the lubrication grooves 58A, 58B. Such cross-flow of lubricant is of particular benefit in high contamination uses (e.g., off-highway heavy haul trucks) of spherical bearings to allow lubricant to flow between the lubrication grooves 58A, 58B, even if a portion of one of the lubrication grooves 58A, 58B becomes plugged with the contamination.

The first lubrication groove 58A initiates at a first position 62 and terminates at a second position 64; and the second lubrication groove 58B initiates at a third position 66 and terminates at a fourth position 68, on the tapered portion 26B of the cover end 24B. Remaining portions of the first and second lubrication grooves 58A, 58B are spaced apart from the tapered portion 26A of the stud end 24A by a distance equal to or greater than a predetermined distance D. Spacing the remaining portions of the lubrication grooves 58A, 58B apart from the tapered portion 26A of the stud end 24A, helps retain the lubricant in the spherical bearing 12 by eliminating a potential exit passage for the lubricant at the stud end.

Prior to or during operation, the first and second lubrication grooves 58A, 58B are charged with lubricant through the bore 37 and their respective initiating and terminating positions 62, 64, 66 and 68 on the tapered portion 26B. The initiating and terminating positions 62, 64, 66 and 68 facilitate the flow of lubricant into the spherical bearing 12. The lubrication grooves 58A, 58B store lubricant therein for spreading the lubricant over the external surface 18 of the ball 16 and/or the inside surface 22 of the outer race 14. Use of the lubrication grooves 58A, 58B, to spread the lubricant helps keep the spherical bearing 12 properly lubricated and extends the useful life of the spherical bearing.

While the first and second lubrication grooves 58A, 58B are described as initiating and terminating at respective positions on the tapered portion 26B of the cover end 24B, the present invention is not limited in this regard as other outer race configurations, including but not limited to those having one lubrication groove, more than two lubrication grooves, multiple lubrication grooves initiating and/or terminating at common positions and one or more lubrication grooves having a screw shaped pattern can also be employed without departing from the broader aspects of the present invention.

Figure 7:
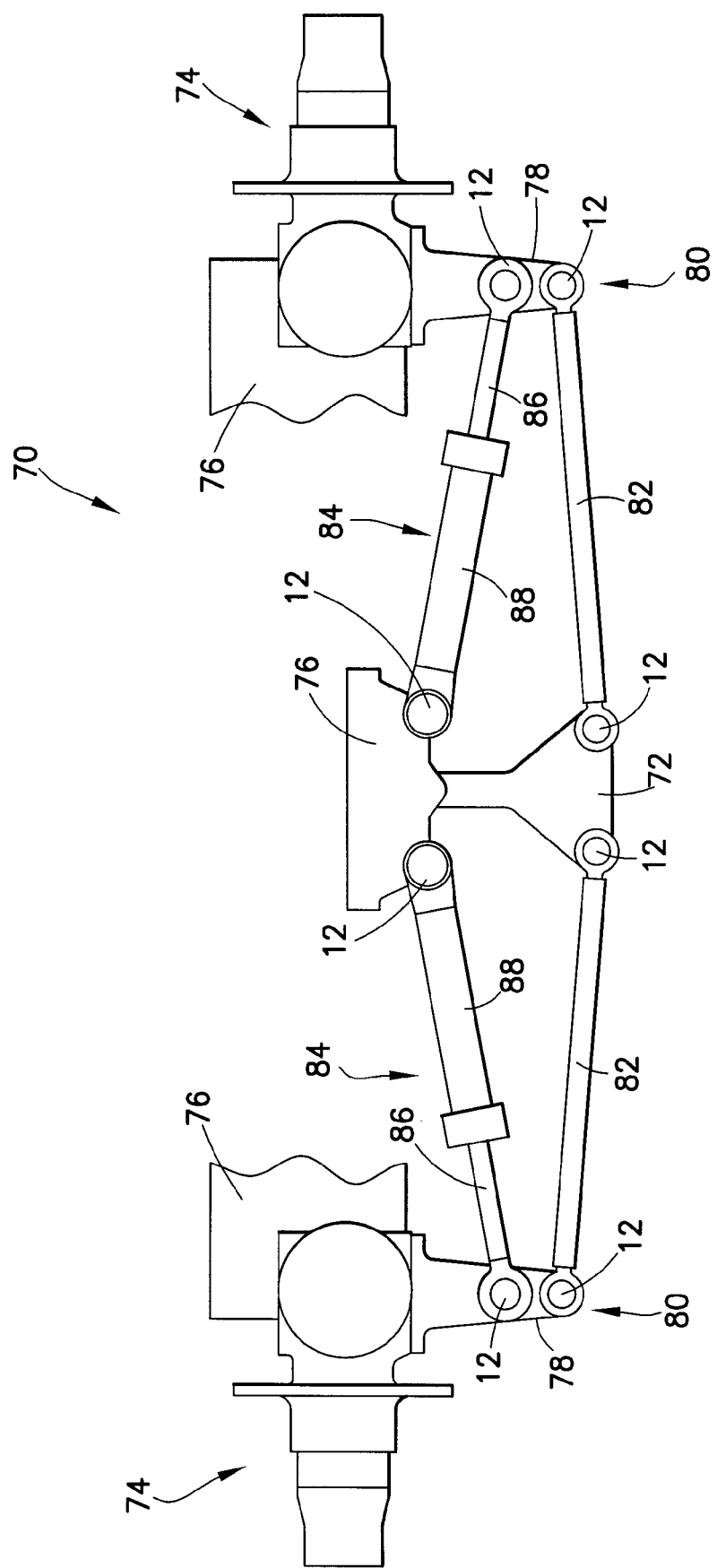
FIG. 7 is a schematic illustration of spherical bearings installed in a steering system.

Referring to FIG. 7, a steering assembly 70 is shown having a steering member 72 and two hubs 74, all pivotally coupled to separate locations on the frame 76. Each of the hubs 74 have a control arm 78 projecting therefrom. A distal end 80 of each of the control arms 78 is pivotally coupled to the steering member 72 by a tie rod 82. In addition, each of the hubs 74 have a piston 84 with one end pivotally coupled to a position adjacent the distal end 80 of the control arm 78 and an opposing end of the piston pivotally coupled to the frame 74. The pistons 84 each include a cylinder portion 86 slidingly disposed within a tube portion 88 so that the opposing ends can move towards and/or away from each other in response to forces applied thereto. Each of the tie rods 82 and pistons 84 have the spherical bearing 12, described above, positioned in opposing ends thereof for providing the pivotal coupling with the frame 74, the control arm 78 and/or the steering member 72. The steering assembly 70 described herein has utility, for example, in off-highway heavy haul trucks which operate in conditions subject to much contamination. Use of the spherical bearings 12 extend the useful life of the steering assembly 70 of a heavy haul truck by improving lubrication and mitigating the potential for contaminants to enter the spherical bearing.

Although the present invention has been disclosed and described with reference to certain embodiments thereof, it should be noted that other variations and modifications may be made, and it is intended that the following claims cover the variations and modifications within the true scope of the invention.

What is claimed is:

1. A spherical bearing comprising:
a ball having an external surface defined by an outside diameter of said ball;
an outer race having an inside surface contoured to a shape defined by said external surface of said ball, said inside surface extending between a stud end and a cover end of said outer race;
said ball being moveably positioned within said outer race such that said inside surface and said external surface slidably engage one another; and
wherein said inside surface includes at least one lubrication groove formed therein, said lubrication groove initiating at a first position adjacent to said cover end and terminating at a second position adjacent to said cover end and wherein remaining portions of said lubrication groove are spaced apart from said stud end.

2. The spherical bearing of claim 1, wherein said at least one lubrication groove intersects with another lubrication groove.

3. The spherical bearing of claim 1, wherein said ball includes a stud extending therefrom and projecting outwardly from said stud end of said outer race.

4. The spherical bearing of claim 1, wherein at least one tapered surface extends outwardly from said inside surface and terminates at one of said stud end and said cover end.

5. The spherical bearing of claim 4, wherein said lubrication groove intersects said tapered surface adjacent to said cover end, at least at one of said first and second positions.

6. The spherical bearing of claim 1, further comprising:
a mounting groove formed in and extending around a portion of said inside surface adjacent to said stud end; and
a compliant seal having a base portion and at least one lip portion extending from said base portion, said base portion being secured in said mounting groove and wherein said at least one lip portion protrudes from said mounting groove and is in sliding engagement with said external surface.

7. A rod end assembly comprising
a rod end having a bearing receiving portion and a shaft portion extending from said bearing receiving portion, said bearing receiving portion having a bore extending therethrough and defined by an inside surface;
a spherical bearing disposed within said bearing receiving portion, said spherical bearing comprising:
a ball having an external surface defined by an outside diameter of said ball;
an outer race having an inside surface contoured to a shape defined by said external surface of said ball, said inside surface of said outer race extending between a stud end and a cover end of said outer race;
said ball being moveably positioned within said outer race such that said inside surface of said outer race and said external surface slidably engage one another; and
wherein said inside surface includes at least one lubrication groove formed therein, said lubrication groove initiating at a first position adjacent to said cover end and terminating at a second position adjacent to said cover end and wherein remaining portions of said lubrication groove are spaced apart from said stud end.

8. The spherical bearing of claim 7, wherein said at least one lubrication groove intersects with another lubrication groove.

9. The spherical bearing of claim 7, wherein said ball includes a stud extending therefrom and projecting outwardly from said stud end of said outer race.

10. The spherical bearing of claim 7, wherein at least one tapered surface extends outwardly from said inside surface and terminates at one of said stud end and said cover end.

11. The spherical bearing of claim 10, wherein said lubrication groove intersects said tapered surface adjacent to said cover end, at least at one of said first and second positions.

12. The spherical bearing of claim 7, further comprising:
a mounting groove formed in and extending around a portion of said inside surface adjacent to said stud end; and
a compliant seal having a base portion and at least one lip portion extending from said base portion, said base portion being secured in said mounting groove and wherein said at least one lip portion protrudes from said mounting groove and is in sliding engagement with said external surface.

13. A steering assembly comprising:
a frame;
a steering member and two hubs, all pivotally coupled to said frame, each of said hubs having a control arm projecting therefrom, wherein a distal end of each of said control arms is pivotally coupled to said steering member by a respective tie rod and each of said hubs have a piston with one end pivotally coupled to said control arm and an opposing end pivotally coupled to said frame;
a spherical bearing disposed in opposing ends of each of said tie rods and said pistons, for providing the pivotal coupling with at least one of the frame, the control arm and the steering member, said spherical bearing comprising:
a ball having an external surface defined by an outside diameter of said ball;
an outer race having an inside surface contoured to a shape defined by said external surface of said ball, said inside surface extending between a stud end and a cover end of said outer race;
said ball being moveably positioned within said outer race such that said inside surface of said outer race and said external surface slidably engage one another; and
wherein said inside surface includes at least one lubrication groove formed therein, said lubrication groove initiating at a first position adjacent to said cover end and terminating at a second position adjacent to said cover end and wherein remaining portions of said lubrication groove are spaced apart from said stud end.

* * * * *